United States Patent [19]

Baron et al.

[11] 4,087,258

[45] May 2, 1978

[54] PROCESS FOR PURIFYING RAW GAS FROM THE GASIFICATION OF SOLID FUELS

[75] Inventors: Gerhard Baron, Hofheim; Herbert Bierbach; Carl Hafke, both of Frankfurt am Main, all of Germany

[73] Assignee: Metallgesellschaft Aktiengesellschaft, Frankfurt am Main, Germany

[21] Appl. No.: 776,069

[22] Filed: Mar. 9, 1977

Related U.S. Application Data

[63] Continuation of Ser. No. 590,239, Jun. 25, 1975, abandoned.

[30] Foreign Application Priority Data

Feb. 5, 1975 Germany .............................. 2504657

[51] Int. Cl.² .......................... C01K 1/06; C01J 3/00; B01D 53/34
[52] U.S. Cl. .................... 48/197 R; 48/206; 55/68; 55/73; 423/232; 423/245; 423/215.5; 252/373
[58] Field of Search ...................... 423/210, 215.5, 232, 423/220, 245; 55/85, 93, 73, 94, 223; 48/197 R, 206; 252/373

[56] References Cited

U.S. PATENT DOCUMENTS

| | | | |
|---|---|---|---|
| 3,011,966 | 12/1961 | Jahnentz et al. | 55/85 X |
| 3,518,812 | 7/1970 | Kolm | 55/94 |
| 3,540,867 | 11/1970 | Baron et al. | 48/197 R |
| 3,834,127 | 10/1974 | Jordon et al. | 55/220 |

*Primary Examiner*—Earl C. Thomas
*Attorney, Agent, or Firm*—Burgess, Dinklage & Sprung

[57] ABSTRACT

A process is disclosed for purifying raw gas produced by the gasification of solid fuels under superatmospheric pressure by treatment with gasifying agents containing water vapor and free oxygen. The raw gas contains dust and hydrocarbons and is at a temperature of 400°–700° C as it leaves the gas producer. The raw gas is purified by spraying in at least two scrubbing stages with virtually dustfree, highly dispersed scrubbing water at temperatures of 160°–300° C. In this manner, the gas is cooled to a temperature that is 0°–20 C above the scrubbing water temperature and is saturated with water vapor in the scrubbing stages. Thereafter, the gas is subjected to centrifugal force to increase the relative velocity between gas and water droplets. The scrubbing water which contains dust and tar is withdrawn from each scrubbing stage. For the first scrubbing stage a cyclone-type scrubber can be used and for the second scrubbing stage a radial flow-type scrubber or a Venturi-type scrubber can be used.

8 Claims, 3 Drawing Figures

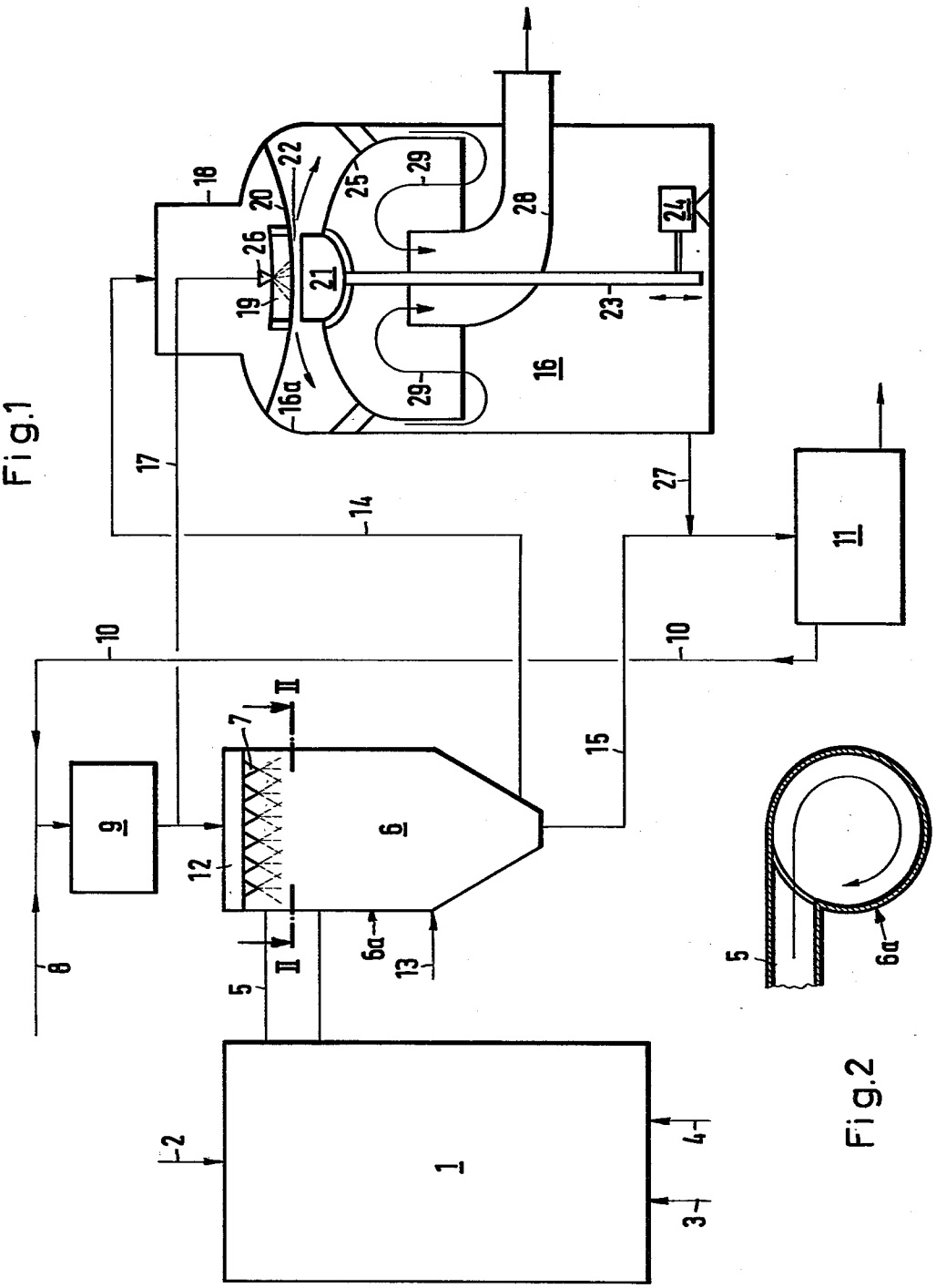

PROCESS FOR PURIFYING RAW GAS FROM THE GASIFICATION OF SOLID FUELS

This is a continuation, of application Ser. No. 590,239, filed June 25, 1975, and now abandoned.

BACKGROUND

This invention relates to a process of purifying raw gas produced by a gasification of solid fuels under superatmospheric pressure by a treatment with gases that contain water vapor and free oxygen and, if desired with other gasifying agents.

The pressure gasification of coal by a treatment with oxygen and water vapor and, if desired, carbon dioxide is known, e.g., from U.S. Pat. No. 3,540,867. In that process, the pressure in the gasifying reactor is in the range of approximately 4–150 bars, preferably 10–80 bars. The known process can be used to gasify various kinds of coal as well as peat, which is suitably charged into the gas producer in the form of peat briquettes.

In the above-mentioned patent, it is also described that the hot raw gas produced by pressure gasification is passed through a scrubber-cooler, in which the gas is directly contacted with warm water. The water is supplied through a normal pipe conduit, which contains no dispersing or spraying means. Roof-shaped internal fixtures are incorporated in the scrubber-cooler to ensure a more uniform distribution of the water throughout the cross-section of the well of the cooler. These internal fixtures do not result in an optimum mixing of water and gas so that at least part of the water can flow through the raw gas in threads heaving a small surface area. For this reason the cleaning action of the scrubber-cooler is often insufficient. Particularly, it is not always ensured that the gas is saturated with water vapor at the temperature at which the gas exits from the scrubber-cooler. In the known scrubber-cooler, part of the dust entrained by the raw gas is not sufficiently cooled. Owing to the resulting more elevated temperatures, these dust particles do not act as condensation nuclei. For this reason the raw gas having this purification stage is not virtually free of dust but contains at least about 1000 milligrams solids per standard cubic meter.

This invention seeks to improve the purification of the gas and to scrub the raw gas so intensely with water that its dust content meets the requirements to be fulfilled when the gas is to be used in machines. To this end the solids content of the gas should not exceed 10 mg/standard m$^3$ and should preferably lie in the range of 1–6 mg/standard m$^3$.

SUMMARY

According to the invention, the raw gas which contains dust and hydrocarbons and which leaves the gas producer or producers at temperatures of 400°–700° C is sprayed in at least two scrubber stages with virtually dust-free, highly dispersed scrubbing water at 160°–300° C and the gas is thus cooled to a temperature that is 0°–20° C above the scrubbing water temperature and is saturated with water vapor, and that the water which contains dust and tar is withdrawn from each scrubbing stage. In that process there is no circulation of part of the scrubbing water used in a stage as such circulation could cause a return into the gas of part of the dust which has been removed by scrubbing.

DESCRIPTION

The scrubbing water must not contain more than 200 mg solids per liter. The scrubbing water is injected into the gas in the form of small droplets and is highly dispersed and partly evaporates so that a desired cooling is accomplished. As a result, the raw gas is quickly saturated with water vapor. The first scrubbing stage is preferably a cyclone scrubber, to which the raw gas is admitted tangentially to the inside surface of the cyclone so that a swirl is automatically produced in the cyclone. The scrubbing water is injected into the cyclone scrubber approximately vertically from above. The radial forces of the swirling gas throw the water droplets and the dust particles which are wetted or not wetted by the water outwardly toward the wall of the scrubbing vessel, where they impinge on a liquid film which runs down. The same takes place with the hydrocarbon droplets. The relative velocities of the water droplets and the gaseous constituents are high so that the dust is more likely to be wetted. Additional scrubbing water may be injected in the lower half of the cyclone scrubber if this is required.

Two scrubbing stages are usually sufficient. The second scrubbing stage may consist, e.g., of a radial flow scrubber or a Venturi tube scrubber. In a radial flow scrubber and in a Venturi scrubber there is also a high relative velocity between the gas and the water droplets so that the solid particles in the gas are most likely to be wetted. Softened or entirely salt-free water is used as the scrubbing water in the second or last scrubbing stage.

To ensure that the raw gas will be quickly saturated with water vapor in the scrubbing stages and that the solid particles will be likely to be wetted, the scrubbing water is finely sprayed through nozzles into the scrubber-cooler, suitably at a rate of 0.5–6 liter per standard cubic meter of raw gas. The gas pressure in the scrubbing stages is about the same as in the gas-producing reactor at 4–150 bars, preferably 10–80 bars.

For ecological reasons, any sulfur compounds contained in the raw gas produced by pressure gasification must be scrubbed from the gas. This is suitably accomplished after the last scrubbing stage in a known desulfurizing process by a treatment, e.g., with an aqueous solution of potassium carbonate. For this purpose the gas must be cooled to or below 130° C by heat exchange. The subsequent desulfurization is effected approximately under the pressure under which the gas has left the preceding scrubbing stage. When the gas has been scrubbed in the last scrubbing stage to be sufficiently free of dust and when the sulfur compounds have thus been removed, the gas can be used, e.g., directly in a power plant process. It may be desirable to heat the desulfurized gas to temperatures of 160°–180° C and to saturate it with water vapor at the same time before the energy of the gas is utilized. In that case the saturation temperature should be selected so that the resulting moist raw gas has a lower heating value above 800 kcal/standard m$^3$ for its subsequent combustion.

To increase the energy content of the gas, condensed hydrocarbons which have been removed are returned into the gas as far as possible before the gas is used, e.g., in a power plant process. For this purpose, purified, tar-containing water from the scrubbing stages may be added to the scrubbing water. The purification of the scrubbing water and the removal of the tar are accomplished in known manner. Highly volatile, liquid hydrocarbons may also be added to the scrubbing stages.

DESCRIPTION OF THE DRAWING

Details of the process will now be explained more fully with reference to the drawing in which FIG. 1 is a flow diagram of the gas purification process FIG. 2 is a sectional view taken on line II—II through the cyclone scrubber of FIG. 1.

Figure 3:
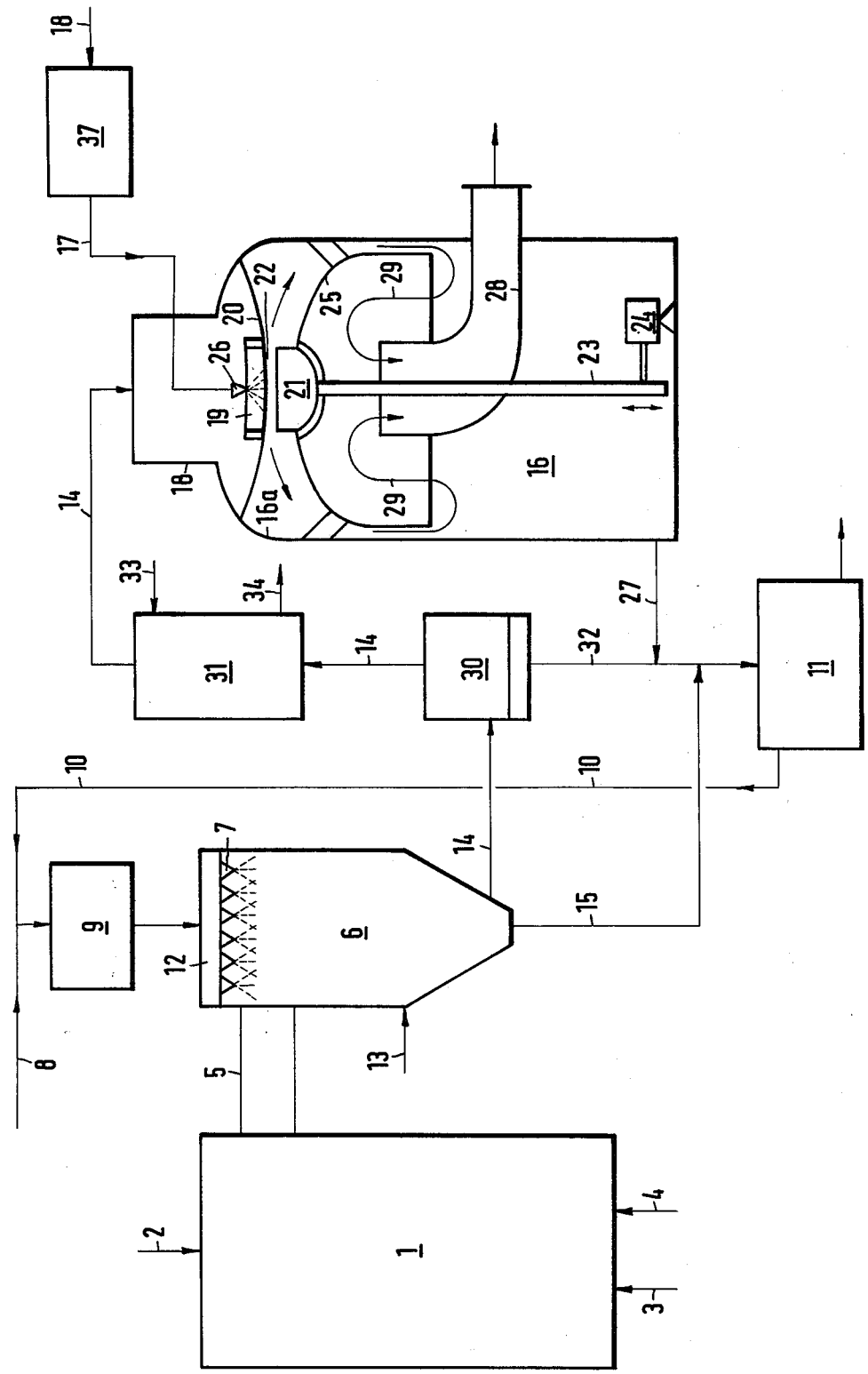
FIG. 3 is a flow diagram of a gas purification process which includes a desulfurization.

In accordance with the flow scheme of FIG. 1, solid fuels, such as coal or possibly peat, are gasified under superatmospheric pressure in known manner in a gas producer 1. The pressure in the gas producer is in the range of 4-150 bars, preferably 10-80 bars. The fuel is charged through a conduit 2. The gasifying agents, which consist of water vapor and of gases which contain free oxygen, are added through conduits 3 and 4. The product gas leaves the gas producer 1 through a conduit 5. When mineral coal is used as a fuel and the gasification is effected with air and water vapor and under a pressure of 20 bars, the product gas has approximately the following composition, based on dry gas:

$H_2$: 18-25 % by volume
CO: 14-22% by volume
$CO_2$: 11-16% by volume
$CH_4$: 3-5% by volume
$C_nH_m$ other than $CH_4$: 0.1-0.4% by volume
$N_2$: 36-48% by volume
Water vapor: 100-400 g/standard $m^3$ of dry gas
Dust: 2-12 g/standard $m^3$ of dry gas In the feed coal, sulfur is present mainly in the form of hydrogen sulfide. The proportion of sulfur compounds by volume may vary within a wide range because it depends on the sulfur content of the feed coal.

In a cyclone scrubber 6, the raw gas which comes from conduit 5 and is at a temperature of 400°-700° C is intensely sprayed with water from a number of nozzles 7. The water is at a temperature of 160°-300° C, in most cases in the range of 160°-180° C. From the conduit 5, the gas is admitted tangentially to a cylindrical wall 6a of the cyclone scrubber, see also FIG. 2, so that a swirling gas flow results in the scrubber 6. The pressure in the gas outlet of the scrubber is about 0.1-0.5 bar below the pressure in the gas producer.

The scrubbing water for the cyclone scrubber 6 is virtually free of dust to ensure a good cleaning action. The content of dust or solids in the scrubbing water is preferably below 200 mg/liter. Fresh water from conduit 8 is fed into a pressure heater 9 and purified, tar-containing water discharged from a tar separator 11 through a conduit 10 are jointly fed into the pressure heater 9, from which scrubbing water under a pressure which is 2-50 bars above the pressure in the scrubber 6 is fed to the manifold 12, from which it is sprayed into the scrubber through nozzles 7. The arrangement of the spray nozzles 7 in the scrubber may vary. It may be desirable to inject part of the water through nozzles into conduit 5. A good dispersion of the scrubbing water over the cross-section of the scrubber is important. The cooling and saturation of the raw gas may be improved by the use of additional nozzles, which are arranged in the lower half of the scrubber and supplied with scrubbing water through a conduit 13. In this case the conduit 13 is connected to the pressure heater 9.

The gas leaving the cyclone scrubber 6 through conduit 14 has a very small residual dust content and is virtually saturated with water vapor.

Dust-containing scrubbing water together with condensed tar from the raw gas are withdrawn from the scrubber through a conduit 15 and are fed into the tar separator 11, in which dust-containing heavy tar is separated from the scrubbing water as a result of the different specific gravities. The dust-containing heavy tar is preferably returned into the gas producer 1. Water which has a small residual dust content and contains also hydrocarbons is re-used as scrubbing water and is withdrawn through conduit 10 and returned to the scrubbing process. If much dust is discharged from the gas producer it may be desirable to use part of the virtually dust-free tar also for scrubbing and to feed this tar into conduit 10.

The gas is conducted in conduit 14 to a radial flow scrubber or Venturi type scrubber 16 and is re-scrubbed therein with highly dispersed water at 160°-300° C, preferably 170°-220° C. The radial flow scrubber is only diagrammatically shown in FIG. 1. It is described in detail, e.g., in Printed German Application No. 2,224,519 and in U.S. Pat. No. 3,834,127. The scrubber is provided at its top with a short pipe 18 for connection to conduit 14. The gas flows in the scrubber 16 downwardly through a central aperture 19 of a partition 20, which is imperforate except for the aperture 19. The central aperture 19 is almost closed from below by a plate 21. Only a narrow annular gap 22 is left between the central aperture and the plate. To adjust the width of the annular gap 22, the plate is adjusted by means of a rod 23 and a motor 24. The gas which has flown through the annular gap 22 expands and is guided by a bell-shaped guide 25 to the wall 16a.

The gas is continuously sprayed with hot scrubbing water from conduit 17 and from nozzle 26. The temperature lies in the same range as that of the scrubbing water sprayed in the scrubber 6. Because the gas from conduit 14 is at least substantially saturated with water vapor, it is sufficient to spray water through the nozzle 26 at a rate of 0.1-0.3 liter/standard $m^3$ of dry gas.

The expansion of the gas which is forced through the annular gap 22 and saturated with water vapor results in a high turbulence, which involves relative movements between the water droplets and the dust particles. This promotes the separation of the dust and of the dust-containing water droplets.

The gas which is saturated with water vapor is guided radially outwardly to the wall 16a, where a water film is formed, which retains the entrained dust particles and carries them to the bottom of the scrubber. The scrubbing water which collects at the bottom of the scrubber and which contains dust and condensed tar is withdrawn in the conduit 27 and also conducted to the tar separator 11. The gas which is now virtually free of dust flows under a guide plate 25 (arrows 29) and leaves the scrubber through a delivery pipe 28 for further use.

The heating value of the pure gas may be increased by an addition of low-boiling hydrocarbons to the gas in the scrubber 16.

The process shown in FIG. 3 is basically the same as that shown in FIG. 1. For this reason, corresponding parts are provided with the same reference numbers.

The process shown in FIG. 3 is suitable for the purification of gases produced by the gasification of sulfur-containing fuels. For this reason sulfur compounds must be removed from the gas before the last scrubbing stage consisting of the radial flow scrubber 16. To this end, the gas which has left the cyclone scrubber 6 is cooled in a waste heat boiler 30 to the extent which is required for the subsequent desulfurization in 31. If a hot potash solution is used in known manner for scrubbing, the gas is cooled in the waste heat boiler 30 below 130° C and is then passed through the desulfurizer 31. The condensate formed in the waste heat boiler is conducted in conduit 32 also to the tar separation 11. The absorbent is added to the desulfurizer through a conduit 33. Spent absorbent is withdrawn through a conduit 34 and is fed to a regenerator, not shown.

The gas from which sulfur compounds have been sufficiently removed is fed through conduit 14 into the radial flow scrubber 16. It may be suitable to supply the radial flow scrubber 16 with scrubbing water which is approximately at the same temperature as the scrubbing water in the scrubber 6 or at a higher temperature. For this purpose, a separate pressure heater 37 is provided, which is fed with fresh water through line 18. Scrubbing water is fed from the heater 37 through conduit 17 to scrubber 16.

The residual dust content of the gas leaving the waste heat boiler 30 will depend on the operating conditions in said boiler. For this reason it may be desirable to arrange the radial flow scrubber or Venturi type scrubber before the desulfurizer if the dust content exceeds 10 mg/standard m$^3$. After the desulfurizer, the gas may be saturated with water vapor in a simple saturator with or without internal fixtures. If the gas leaving the waste heat boiler contains less than 10 mg dust per standard m$^3$, there will be no need for a radial flow scrubber before the desulfurizer. In that case the gas is saturated in the simple manner described hereinbefore.

EXAMPLE 1

In a process as shown in FIG. 1 about 100,000 standard m$^3$ dry raw gas per hour are produced in a known gas producer under a pressure of 20 bars. The gasifying agents fed into the gas producer consist of about 50,000 standard m$^3$ air per hour, and about 0.7 kg water vapor per standard m$^3$ air. The resulting raw gas has the following composition by volume on a dry basis:

$CO_2$: 13.2%
CO: 18.3%
$H_2$: 24.5%
$CH_4$: 4.2%
$N_2$: 39.6%
$C_nH_m$ other than $CH_4$: 0.2% by volume.

This raw gas leaving the gas producer is at a temperature of a 600° C and is sprayed with 1 liter water per standard m$^3$ raw gas in the cyclone scrubber 6, in which a pressure of 19.8 bars is maintained. The water temperature is 160° C. The gas which leaves the scrubber 6 is saturated with water vapor and at a temperature of about 170° C and has a residual dust content of 550 mg/standard m$^3$. This gas is sprayed with 0.2 liter water per standard m$^3$ gas in the radial flow scrubber 16. The temperature of the scrubbing water is about 170° C. The pressure in the scrubber adjacent to its gas inlet is 19.7 bars. The gas-water mixture is passed through an annular gap 22, which is adjusted to a pressure drop of about 0.5 bar. The purified gas for further use has a residual dust content of 5 mg/standard m$^3$. The gas which is saturated with water vapor is available at a temperature of 170° C and under a pressure of about 19.0 bars.

EXAMPLE 2

In the modified process shown in FIG. 3, coal which contains more sulfur is gasified under the same conditions as in Example 1. The raw gas contains about 0.4% sulfur compounds by volume. This gas is scrubbed in the cyclone scrubber 6 as described in Example 1. For desulfurization, the gas leaving the scrubber 6 is first cooled in the waste heat boiler 30° to 120° C and is then treated with an aqueous solution of $K_2CO_3$ in the desulfurizer 31 under a pressure of about 19.5 bars. The sulfur compound content of the gas is thus reduced to about 300 ppm. The $K_2CO_3$ solution is regenerated in known manner by being flashed and heated. The virtually sulfur-free gas is treated further in the radial flow scrubber under the conditions stated in Example 1.

What is claimed is:

1. In the production of a purified hydrogen and carbon monoxide-containing gas comprising the steps of treating a solid fuel at a pressure of 4 to 150 bars with a gasifying agent containing water vapor and oxygen to produce a raw gas containing hydrocarbons, sulfur compounds and dust in the amount of about 2 to 12 grams per standard cubic meter of dry gas and which is at a temperature of 400° to 700° C, the improvement which comprises spraying into the raw gas in a first scrubbing stage under a pressure of 4 to 150 bars highly dispersed scrubbing water at a temperature of 160° to 300° C thereby saturating the gas with water vapor, the scrubbing water containing less than 200 milligrams of solids per liter, 0.5 to 6 liters of scrubbing water being sprayed in per standard cubic meter of gas whereby the gas is cooled to a temperature of 0° to 20° C above the scrubbing water temperature, said first scrubbing stage being a cyclone scrubbing zone to which the raw gas is admitted tangentially to the inside surface of said zone, passing the gas into a second scrubbing stage at a pressure of 4 to 150 bars, spraying into said second stage in radial direction salt-free water with a temperature of 160° to 300° C containing less than 200 milligrams of solids in an amount of 0.1 to 0.3 liter per standard cubic meter of dry gas, removing from the second stage purified gas saturated with water vapor and containing 1 to 6 milligrams of solids per standard cubic meter, desulfurizing the gas after at least one of the first and second scrubbing stages and feeding the scrubbed and desulfurized gas into a power plant process.

2. Process of claim 1 wherein the second scrubbing stage is a radial flow scrubber.

3. Process of claim 1 wherein the second scrubbing stage is a Venturi type scrubber.

4. Process of claim 1 wherein the gas pressure in the scrubbing stages is 10–80 bars.

5. Process of claim 1 wherein tar-containing water from a tar separator is used as scrubbing water in at least the first scrubbing stage.

6. Process of claim 1 wherein additional hydrocarbons are added to the scrubbing water for the first scrubbing stage.

7. Process of claim 1 wherein the gas which contains up to 10 mg dust per standard is thereafter fed into a desulfurizer.

8. Process of claim 7 wherein the gas is cooled to temperatures below about 130° C and condensate is removed from the gas before it is desulfurized.

* * * * *

UNITED STATES PATENT AND TRADEMARK OFFICE
CERTIFICATE OF CORRECTION

PATENT NO. : 4,087,258
DATED : May 2, 1978
INVENTOR(S) : Gerhard Baron et al

It is certified that error appears in the above—identified patent and that said Letters Patent are hereby corrected as shown below:

| | |
|---|---|
| Title Page<br>Ref. cited | Cancel "Jordon" and substitute --Jordan--. |
| Col. 1, line 43 | Cancel "having" and substitute --leaving--. |
| Col. 6, lines 62,63 | Claim 7, delete "which contains up to 10 mg per standard". |

Signed and Sealed this

Twenty-first Day of November 1978

[SEAL]

Attest:

RUTH C. MASON
*Attesting Officer*

DONALD W. BANNER
*Commissioner of Patents and Trademarks*